United States Patent

Kawabe et al.

Patent Number: 5,482,904
Date of Patent: Jan. 9, 1996

[54] HEAT-INSULATING REFRACTORY MATERIAL

[75] Inventors: Hideaki Kawabe; Shozou Hagiwara; Koji Kuga; Setsunori Hamaguchi, all of Kitakyushu, Japan

[73] Assignee: Krosaki Corporation, Fukuoka, Japan

[21] Appl. No.: 325,293

[22] PCT Filed: Mar. 3, 1993

[86] PCT No.: PCT/JP94/00349

§ 371 Date: Oct. 31, 1994

§ 102(e) Date: Oct. 31, 1994

[87] PCT Pub. No.: WO94/20435

PCT Pub. Date: Sep. 15, 1994

[30] Foreign Application Priority Data

Mar. 10, 1993 [JP] Japan ................................. 5-049560
Dec. 27, 1993 [JP] Japan ................................. 5-331074

[51] Int. Cl.$^6$ ........................... C04B 38/00; C04B 38/10
[52] U.S. Cl. ........................... 501/84; 501/80; 501/81; 252/62
[58] Field of Search ........................... 501/80, 81, 84, 501/85; 252/62; 106/DIG. 1, DIG. 2

[56] References Cited

U.S. PATENT DOCUMENTS

| | | | |
|---|---|---|---|
| 4,446,040 | 5/1984 | Samanta | 106/DIG. 2 |
| 4,608,087 | 8/1986 | Yoshino et al. | 252/62 |
| 5,252,526 | 10/1993 | Whittemore | 501/80 |
| 5,360,771 | 11/1994 | Delvaux et al. | 501/80 |

FOREIGN PATENT DOCUMENTS

| | | |
|---|---|---|
| 51-125416 | 11/1976 | Japan . |
| 55-43616 | 3/1980 | Japan . |
| 55-32754 | 3/1980 | Japan . |
| 60-34354 | 3/1985 | Japan . |

*Primary Examiner*—Mark L. Bell
*Assistant Examiner*—Michael Marcheschi
*Attorney, Agent, or Firm*—Jordan and Hamburg

[57] ABSTRACT

The present invention is intended to provide a heat-insulating refractory material, which does not contain environmentally and hygienically undesirable ceramic heat-insulating fibers, but only contains organic fibers to the extent necessary to improve adhesive rate upon spraying, and which can nevertheless achieve a specified heat-insulating effect. The heat-insulating refractory material includes a mixture containing 2–50 wt % of a foaming raw material foamed by heat at a temperature from 400° to 1500° C. and 50–98 wt % of a refractory powder, and a liquid binder which is added to the mixture in an amount of 20–250 wt % on the basis of the weight of the mixture.

3 Claims, 1 Drawing Sheet

HEAT-INSULATING REFRACTORY MATERIAL

TECHNICAL FIELD

The present invention relates to a heat-insulating refractory material for suppressing heat dissipation, which is used for the surfaces of refractories of linings in an industrial furnace or the surfaces of refractories for steel casting.

BACKGROUND ART

As refractories for steel casting, into which molten steel at about 1500° C. is poured, there has been used a graphite containing refractory composition of high thermal shock resistance. The refractory composition has a high thermal conductivity because of the contained graphite, and it allows a large amount of heat dissipation from the outer surface thereof. The graphite containing refractory composition is pre-heated before being used to prevent the generation of cracks due to abrupt thermal change; however, these prevention abilities are limited because the temperature is rapidly dropped for a period of time from the completion of heating to the beginning of casting.

To cope with the above problem, for example, Japanese Unexamined Utility Model Publications Nos. SHO 55-43616 and SHO 60-34354 disclose a method of attaching $Al_2O_3$—$SiO_2$ or $Al_2O_3$—$SiO_2$—$CaO$ based ceramic heat-insulating fibers on the surfaces of refractories. This method, however, is disadvantageous in that while the contained fibers provide high heat resistance and heat-insulation, the fibers, which have sizes in the order of several microns and are harmful to the human body, are set loose in the atmosphere when the heat causes loss of the binder.

As a means for obtaining a general heat-insulating structure in place of the above ceramic heat-insulating fibers, a monolithic refractory material mixed with organic fibers lost by heating may be proposed. However, to obtain a good heat-insulating effect with only organic fibers, a large amount of the organic fibers must be added, which has the disadvantage of significantly reducing the strength of the refractory material.

The subject to be solved by the present invention is to provide a heat-insulating refractory material, which does not contain environmentally and hygienically problematic ceramic heat-insulating fibers, only contains organic fibers to the extent necessary to improve adhesive rate upon spraying, and can nevertheless achieve a specified heat-insulating effect.

DISCLOSURE OF THE INVENTION

The present invention has been accomplished under the basic premise that it becomes possible to achieve an excellent heat-insulating effect without any of the above disadvantages by coating a foaming material of high heat-insulating effect on the refractory surfaces of linings of an industrial furnace or the surfaces of refractories for steel casting, and then foaming the coated material by heating or by the heat of molten steel.

Namely, the present invention includes a heat-insulating refractory material, which is composed of a mixture containing 2–50 wt % of a foaming material foamed by heat at 400°–1500° C. and 50–98 wt % of a refractory powder, a liquid binder which is added to the mixture in an amount of 20–250 wt % on the basis of the weight of the mixture.

A glass powder softened and molten at 400°–1500° C. may be further added in an amount of 0.1–100 wt % on the basis of the above mixture; or organic fibers lost by heating, such as yarns, pulp cotton, or vinylon fibers may be further added in an amount of 0.01–5 wt % on the basis of the above mixture to enhance the adhesive rate upon spraying.

The foaming raw material may include shirasu, vermiculite, obsidian, pearlite, pitch stone, expanded shale, fly ash and the like. In particular, obsidian or pearlite is desirable to generate a number of bubbles by the addition of a small amount. The added amount of the foaming material is required to be in the range from 2 to 50 wt %. When it is less than 2 wt %, the foamed amount is insufficient to achieve the desired heat-insulating effect. When it is more than 50 wt %, the excessive foamed amount imperils the strength required for the heat-insulating refractory material.

The glass powder is used for holding the gas generated from the raw material foamed by heating within the coating film. When the refractory powder becomes molten, the glass powder is not necessarily required. However, by the addition of the glass powder, the molten glass film covers the portion around the gas generated from the foaming raw material particularly under the heating condition of 400°–1500° C. and prevents the gas from escaping outside the coating film. The glass powder must be softened and molten at 400°–1500° C. to effectively hold the gas generated from the foaming raw material at 400°–1500° C. within the coating film. When too much glass powder is added, the viscosity of the molten coating film is reduced and a continuous heat-insulating layer is not formed by the down-flow phenomenon of the coating film. Accordingly, the upper limit of the added amount is specified at 100 wt %.

As for the refractory powder, powders of roseki, silica stone, chamotte, mullite, alumina, fused silica, zirconia and the like may be used. The added amount is specified to be in the range from 50 to 98 wt %. When the refractory powder added is less than 50 wt%, the fire resistance of the coating film is reduced, and a down-flow phenomenon of the coating film molten at a high temperature is generated because of the reduced viscosity. When the refractory powder added is more than 98 wt %, the added amount of the foaming raw material is relatively lowered, thus failing to obtain a sufficient heat-insulating effect.

The organic fibers lost by heating are used to enhance the adhesive rate upon spraying, and are not necessarily required for the pouring operation and brush-coating operation. When the added amount becomes excessive, the strength of the heat-insulating refractory material is significantly reduced when the fibers are lost by heating, and the adhesive rate is not significantly improved. Accordingly, the upper limit of the added amount is specified at 5 wt %.

The foaming raw material, glass powder and refractory powder are adjusted in particle size so that the total particle size preferably becomes 3 mm or less, and are kneaded with a liquid binder. Here, the liquid binder means a liquid material such as water, organic solvent, organic paste, silica sol, alumina sol or zirconia sol; and a solution in which a powder binder is dissolved with water, organic solvent or the like. The added amount of the liquid binder is specified to be in the range from 20 to 250 wt % to adjust the consistency of the foaming raw material, glass powder and refractory powder so that they can be coated on the surfaces of the furnace walls or graphite containing refractories by spraying, pouring or brushing. In the present invention, either of the above-described materials can be used; however, silica sol, alumina sol and zirconia sol are desirable to hold the coating strength at a high temperature.

The kneading is performed by a mixer in the usual manner.

The mixture thus kneaded is coated on refractories by pouring, spraying or brushing, thereby forming a heat-insulating layer, which is expanded by the heat of molten steel or the like and forms blow-holes of excellent heat-insulation, over the whole surfaces of the refractories.

The foaming raw material contained in the heat-insulating refractory material of the present invention is made to be in a slurried state together with the refractory powder and liquid binder. The composition is foamed by heating before or after coating on the surfaces of refractories, and forms blow-holes being effective for heat-insulation over the whole surface. Moreover, by the addition of the glass powder, the gas generated from the foaming raw material can be effectively held within the coating film.

According to the present invention, there can be obtained a heat-insulating refractory material, which does not contain powder; and silica sol was used as a liquid binder. These pearlite, vermiculite, boro-silicate glass and roseki were respectively measured in weight of specified amounts, and then mixed. The silica sol was added to the mixture to such an amount (wt % based on the weight of the mixture) as to ensure a consistency suitable for brush-coating, and kneaded to be in the slurried state. The slurry was coated onto the surfaces of a graphite containing refractories by brushing, to form a heat-insulation layer having a thickness of about 3 mm. This was put in a gas-furnace and heated at a temperature rising rate of 600° C./hr, and kept at 1100° C. for 2 hr, then naturally cooled, and taken out of the furnace. The refractory material was then observed for the formation state of the hollow structure using a reflecting microscope.

TABLE 1

| | comparative example | | | present invention | | | | | |
|---|---|---|---|---|---|---|---|---|---|
| sample No. | 1 | 2 | 3 | 4 | 5 | 6 | 7 | 8 | 9 |
| pearlite (%) | 1 | 51 | 10 | 2 | 50 | 30 | 10 | 40 | 30 |
| roseki (%) | 99 | 49 | 90 | 98 | 50 | 70 | 90 | 50 | 50 |
| vermiculite (%) | — | — | — | — | — | — | — | 10 | 20 |
| boro-silicate glass[softening point: 800° C.] (%) | — | — | +101 | — | — | +50 | +100 | — | — |
| silica sol (%) | +80 | +80 | +160 | +80 | +80 | +120 | +160 | +100 | +120 |
| state after heating at 1100° C. in a gas furnace | The hollow structure could not be obtained because the amount of the foaming raw material was insufficient. | The hollow structure was broken because the amount of the foaming raw material was excessive. | The coagulated hollow structure could be obtained because the amount of the glass material was large. | The continuous hollow structure could be obtained. | The continuous hollow structure could be obtained. | The continuous hollow structure could be obtained. | The continuous hollow structure could be obtained. | The continuous hollow structure could be obtained. | The continuous hollow structure could be obtained. | environmentally and hygienically undesirable ceramic heat-insulating fibers, but only contains organic fibers to the extent necessary to improve adhesive rate upon spraying, and which can nevertheless achieve a specified heat-insulating effect. Moreover, the heat-insulating refractory material has a molten glass film containing independent bubbles, and therefore, it provides excellent shielding effect for air, and has the effect of preventing the oxidization of graphite containing refractories.

BEST MODE FOR CARRYING OUT THE INVENTION

Figure 1:
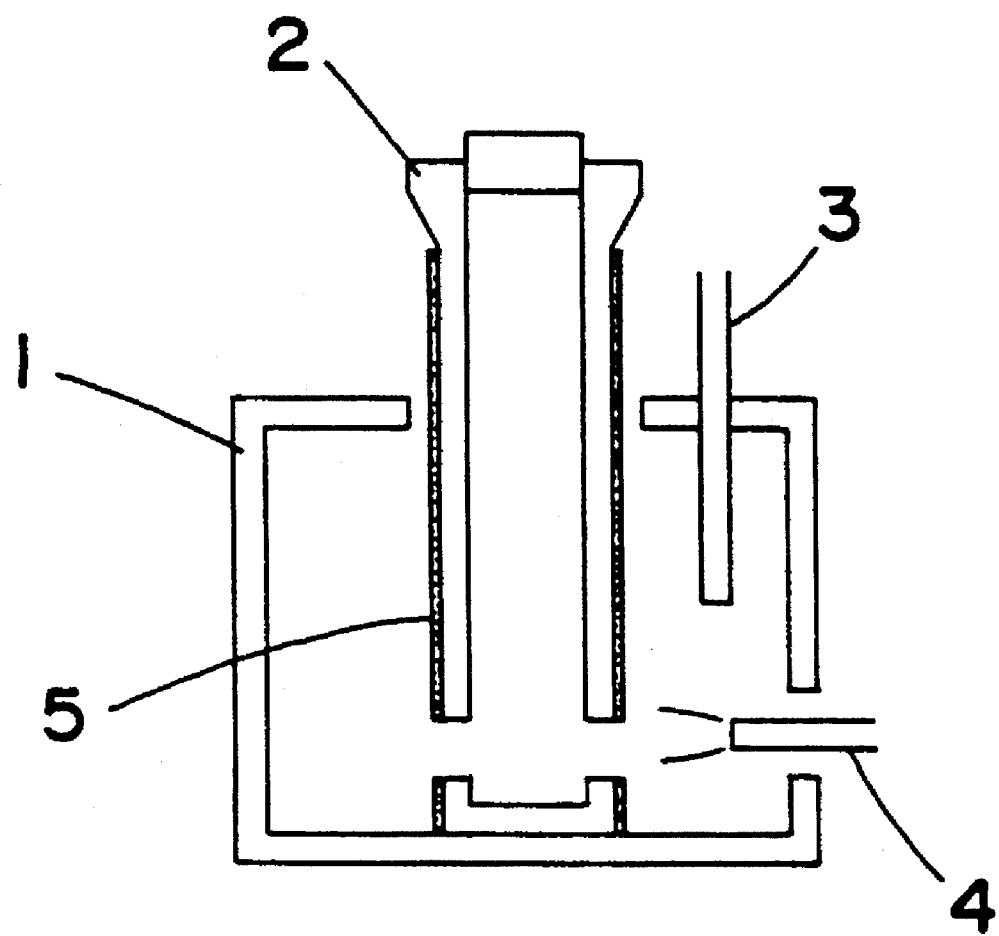
FIG. 1 is a vertical sectional view of a testing apparatus for ensuring the effect of the present invention.

Unfoamed pearlite having an average particle size of 200 μm and vermiculite previously foamed by heating were used as a foaming material; boro-silicate glass having a softening point of 800° C. was used as a glass powder; roseki having an average particle size of 100 μm was used as a refractory As shown in Table 1, for the sample No. 1 in which the content of pearlite added as a foaming material was less than that in the present invention, a molten glass coating film having a hollow structure could not be obtained because of the low content of the foaming raw material. On the other hand, for the sample No. 2 in which the pearlite added as a foaming raw material was more than in the present invention, a molten glass coating film was broken because of the excessive content of the foaming raw material. Accordingly, the content of the foaming raw material is most desirably in a range from 2 to 50 wt %, and, accordingly, roseki added as a refractory powder becomes in the range from 50 to 98 wt %. For the sample No. 3 in which the content of boro-silicate glass added as a glass component melted at 400°–1500° C. was more than that in the present invention, a molten glass coating film having a continuous hollow structure could not be obtained because of the down-flow and coagulation of glass due to the reduction in the viscosity of the molten glass.

On the other hand, in the present invention, the following was confirmed: in each of the samples Nos. 4, 5, 6 and 7 using unfoamed pearlite, a continuous molten glass coating film having a uniform hollow structure over the surface was formed; and in each of the sample Nos. 8 and 9 using unformed pearlite and vermiculite previously foamed by heating, a continuous molten glass coating film having a uniform hollow structure over the surface was also formed.

On the basis of the results of Table 1, a test was performed to confirm the heat-insulating effect of the present invention using a gas furnace.

FIG. 1 is a vertical sectional view showing the measurement state. In this figure, the reference numeral 1 designates a heating box; 2 is an alumina-graphite nozzle; 3 is a thermocoupler; and 4 is a burner. Each of the heat-insulating refractory materials of the samples Nos. 6 and 9 shown in Table 1 were formed on the outer surface of the alumina-graphite casting nozzle 2 by brushing, thus forming a heat-insulating layer 5 having a thickness of 5 mm. This was heated at 1100° C. and was left in the atmosphere. Thus, the temperature drop of the samples from 1100° C. was examined. The sample using the conventional ceramic fibers and the sample without heat-insulating material were examined as comparative examples. As for the measurement position, the sample using the ceramic fibers or the sample with foaming heat-insulating material was measured at the interface between the ceramic fibers or the foaming heat-insulating material and the casting nozzle.

The results are shown in Table 2.

TABLE 2

| kind of heat-insulating material thickness | sample No. 6 5 mm | sample No. 9 5 mm | ceramic fiber 3 mm | absence — |
|---|---|---|---|---|
| Temperature drop after heating | after 5 min. | 109° C. | 98° C. | 101° C. | 171° C. |
| | after 10 min. | 194° C. | 180° C. | 183° C. | 369° C. |
| | after 15 min. | 251° C. | 229° C. | 234° C. | 475° C. |

Table 2 shows the temperature drop of each sample heated at 1100° C. The foaming heat-insulating material of the present invention provided heat-insulation comparable to that of the existing material with ceramic fibers.

In addition, for the material to form bubbles in molten and softened glass, there may be used various organic or inorganic materials generating blow-holes by heating, such as fly ash and shirasu described above, other than the above pearlite and vermiculite. Moreover, for the refractory powder, there may be used powders of silica stone, chamotte, mullite, alumina, fused silica, zirconia and the like. The samples Nos. 10, 11, 12, 13 and 14 were prepared using the combination of these raw materials, which were examined for heat-insulating effect in a gas furnace. As shown in Table 3, these samples were confirmed to have similar heat-insulating abilities to those of the sample No. 6.

TABLE 3

| sample No. | No. 6 | No. 10 | No. 11 | No. 12 | No. 13 | No. 14 |
|---|---|---|---|---|---|---|
| pearlite (%) | 30 | — | — | 30 | 30 | 20 |
| fly ash (%) | — | 30 | — | — | — | — |
| shirasu (%) | — | — | 30 | — | — | — |
| vermiculite (%) | — | — | — | — | — | 10 |
| roseki (%) | 70 | 70 | 70 | — | — | 70 |
| chamotte (%) | — | — | — | 70 | — | — |
| fused silica (%) | — | — | — | — | 70 | — |

TABLE 3-continued

| sample No. | No. 6 | No. 10 | No. 11 | No. 12 | No. 13 | No. 14 |
|---|---|---|---|---|---|---|
| boro-silicate glass (%) | +50 | +50 | +50 | +50 | +50 | +50 |
| silica sol (%) | +120 | +120 | +120 | +120 | +120 | +140 |
| temperature drop after heating (after 15 min since left) | 251° C. | 240° C. | 245° C. | 250° C. | 248° C. | 239° C. |

Since the foaming heat-insulating material of the present invention forms a molten glass coating film having a hollow structure over the whole surface, the shielding effect for air is superior to that of the heat-insulating fibers, which can suppress the oxidization of graphite containing refractories upon heating. In addition, even in the case of independently providing the foaming heat-insulating material of the present invention on the side wall of a heating furnace, the heat dissipation to the outside of the furnace is reduced, thus obtaining a good heat-insulating effect.

Table 4 shows the relationship between the added amount of organic fibers and the adhesive rate upon spraying in the case of the addition of vinylon fibers as the organic fibers. Here, the wording "adhesive rate" means "(weight of the foaming heat-insulating material stuck on the surface of a body to be irradiated)÷(total sprayed weight of the foaming heat-insulating material)×100".

TABLE 4

| refractory material powder for foaming heat-insulation (%) | 100 | 100 | 100 | 100 | 100 |
|---|---|---|---|---|---|
| silica sol (%) | +80 | +80 | +80 | +80 | +80 |
| organic fiber (%) | 0 | 1 | 3 | 5 | 6 |
| adhesive rate upon spraying (%) | 70 | 88 | 90 | 93 | 93 |
| bending strength of material (MPa) | | | | | |
| after drying (110° C. × 24H) | 1.5 | 1.4 | 1.3 | 1.3 | 0.8 |
| after heating (350° C. × 3H) | 1.3 | 1.2 | 1.1 | 0.9 | 0.4 |

As shown in Table 4, as the content of organic fibers is increased, the bending strength of the material is lowered; while even when the content of the organic fibers is more than 5 wt %, the adhesive rate is not enhanced. The same is true for the other yarn and pulp.

As a result, organic fibers for enhancing the adhesive rate are best added in the range of 5 wt % or less of the amounts of the foaming material, refractory powder, liquid binder and glass powder.

INDUSTRIAL APPLICABILITY

The heat-insulating refractory material of the present invention can be used for the surfaces of refractories of linings of an industrial furnace, the surfaces of refractories for steel casting or the like in order to suppress heat dissipation.

What is claimed is:
1. A heat-insulating refractory material comprising:
a mixture containing 2–50 wt % of a foaming raw material selected from the group consisting of shirasu, vermiculite, obsidian, pearlite, pitch stone, expanded shale, and fly ash, said foaming raw being foamed by heat at a temperature from 400° to 1500° C. and 50–98 wt % of a refractory powder, and a liquid binder which is added to said mixture in an amount of 20–250 wt % on the basis of the weight of said mixture.

2. A heat-insulating refractory material according to claim 1, wherein a glass powder softened and molten at a temperature from 400° to 1500° C. is further added in an amount of 0.1–100 wt % on the basis of the weight of said mixture.

3. A heat-insulating refractory material according to claim 1 or 2, in which organic combustible fibers are further added in an amount of 0.01–5 wt % on the basis of the weight of said mixture.

* * * * *